United States Patent Office 3,293,210
Patented Dec. 20, 1966

3,293,210
STABILIZED POLYOXYMETHYLENES CONTAINING ZINC DIALKYL DITHIOPHOSPHATE AND 2-HYDROXY-4-ALKOXY BENZOPHENONE
Vivien Griffiths, Welwyn Garden City, and John Carswell McGowan, Harpenden, England, assignors to Imperial Chemical Industries Limited, London, England, a corporation of Great Britain
No Drawing. Filed Mar. 28, 1963, Ser. No. 268,595
Claims priority, application Great Britain, Apr. 2, 1962, 12,550/62
5 Claims. (Cl. 260—45.75)

This invention relates to compositions comprising high molecular weight oxymethylene polymers.

High molecular weight oxymethylene polymers are solid polymers in which more than 50 in every 100 units in the polymeric chain have the structure —$OCH_2$—. The preferred polymers contain at least 85 and generally at least 95 such units in every 100 units in the polymeric chain. These polymers are normally prepared by the polymerisation or copolymerisation of formaldehyde or one of its low polymers such as trioxane (which is the cyclic trimer of formaldehyde), paraformaldehyde or $a$-polyoxymethylene. The preparation of homopolyoxymethylene is described, for example, in British Patents 748,836 and 753,299 and the preparation of high molecular weight oxymethylene polymers containing other units in the polymeric chain is described in British Patents 807,589 (where formaldehyde is polymerised in the presence of preformed polymers to give block copolymers) and 903,668, which describes the copolymerisation of trioxane with certain cyclic ethers.

The oxymethylene polymers as formed are generally terminated by a hydroxyl group at least at one end of the polymeric chain and sometimes at both, when they may be termed oxymethylene polymer glycols. These hydroxy-ended polymers are unstable to heat and on heating depolymerisation occurs, starting from the end of the chain by what may be called an "unzipping" action. In the case of homopolyoxymethylenes, the polymer is ultimately completely decomposed. In the case of the oxymethylene copolymers the unzipping will halt generally when the first foreign unit in the chain is reached. In both the homopolymers and the copolymers, this "unzipping" may be prevented to a large extent by replacing the vulnerable hydroxyl end-groups of the chains by end-groups which are more stable, for example, carboxylate, ether or urethane end-groups. These may be formed by reacting the hydroxyl-ended polymers with, for example, acid anhydrides, alcohols, acetals, ethers, isocyanates, or epoxides or by forming the polymer in the presence of a compound, such as an acid anhydride or an acetal, that will both act as a chain transfer agent and leave suitable end-groups terminating the polymer chains. Oxymethylene polymers containing these formed end-groups and those formed by the partial degradation of copolymers are also included in the the term "high molecular weight oxymethylene polymers."

Oxymethylene polymers of the kind described may be degraded by autoxidative fission in which the polymer chains are ruptured at one or more intermediate points in their length. This may occur, for example, at elevated temperautres in an oxidising atmosphere. Such conditions may be encountered during processing of the polymer or while it is being used in applications where its high softening point is utilised. The polymers may also suffer degradation through exposure to ultra-violet light. It is an object of this invention to provide oxymethylene polymer compositions which are usefully stabilised against the actions of heat and light.

According to the present invention we provide new polymeric compositions comprising a high molecular weight oxymethylene polymer and a stabilising system comprising a first compound which is either an ester having the structure $S(-R-COOR')_2$ where R is an alkylene radical and R' is an alkyl radical, or a metal dialkyl dithiophosphate, having the structure:

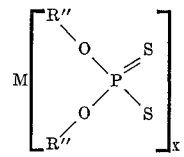

where R" is an alkyl radical, M is a metal atom and $x$ is a whole number equal to the valency of M and a second compound selected from the group consisting of (i) 2-hydroxy-benzophenone or substituted derivatives thereof, (ii) aromatic esters of hydroxy-aromatic acids and (iii) 2-(2'-hydroxy-aryl)-benzotriazole or substituted derivatives thereof.

The two components of our stabilising system tend to show a synergistic effect. For example, the sulphur compound of the system is generally regarded as a heat stabiliser but its effect may be improved by adding the second component which is normally regarded as a light stabiliser. Similarly, the light-stabilising effect of the second component may be enhanced by the presence of the first component.

We have found that our preferred stabilising systems, giving good protection against both light and heat, are those in which the first component is a metal dialkyl dithiophosphate as hereinbefore defined.

The effect of such stabilising systems may be modified by choice of the second component. Thus, we have found that polyoxymethylene compositions containing a metal dialkyl dithiophosphate and 2-hydroxybenzophenone or a substituted derivative thereof or a 2(2'-hydroxy-2-alkyl aryl) benzotriazole or substituted derivative thereof have excellent stability to the action of light and adequate heat stability.

Preferred examples of sulphur containing compounds having the structure $S(-R-COO')_2$ which may be used in our specified compositions are those with at least 10 carbon atoms in the ester groups such as didecyl, dilauryl, ditridecyl, dimyristyl, dicetyl and distearyl thiodiglycollates, thiodiproprionates, thiodibutyrates, thiodivalerates and thiodicaproates. We find that with thiodipropionic acid, the dilauryl ester is particularly suitable.

Preferred examples of metal salts containing our specified organo-phosphorus anions are the metal dialkyl dithiophosphates in which the alkyl groups have at least 6 atoms, such as dihexyl, dioctyl, dinonyl, didecyl, dilauryl, and distearyl dithiophosphates. However, the lower alkyl derivatives such as the di-isopropyl and dibutyl derivatives may also be used if desired. Of the metals we prefer to use those with a valency of 2. We have found that the zinc salts are particularly useful.

Benzophenones that may be used as the second component in our specified stabilising systems are 2-hydroxy-benzophenone and its substituted derivatives, preferably those wherein the substituents are attached to any or all of the 2', 4 and 4' positions. We prefer that the substituent on the 2' position, if any, is a hydroxyl group while preferred substituents on the 4 and 4' position are hydroxy, alkyl and alkoxy groups. Examples are: the 2,2'-dihydroxy, 4,4'-dimethoxy, 2,4-dihydroxy, 2-hydroxy, 2-hydroxy-4-tertiary butyl, 2-hydroxy-4-n-octyl, 2 - hydroxy-4-(2'-ethyl hexyl), 2-hydroxy-(3',5'5'-trimethylhexyl), 2-hydroxy-4-dodecyl, 2-hydroxy-4-tridecyl, 2-hydroxy-4-n-hexadecyl, 2-hydroxy-4-n-octadecyl and the corresponding 2-hydroxy-4-alkoxy-benzophenones, 2,4,4'- trihydroxy - 2,2',4,4' - tetrahydroxy, 2,2' - dihydroxy-4-octyloxy, 2,2'-dihydroxy-4-dodecyloxy, 2,2'-dihydroxy-4-octyl, and 2,2'-dihydroxy-4-dodecyl benzophenones.

Substituents may also be present in the five positions as for instance in 2,4,5-trihydroxy benzophenone and 2-hydroxy-5-octyl benzophenone. Examples of other compounds which may be used are the dibenzoyl and disalicyloyl resorcinols. We prefer to use alkoxy substituted 2-hydroxy or 2,2'-dihydroxy benzophenones.

The next class of compound that may be used as the second component in our stabiliser system comprises aromatic esters of hydroxy aromatic acids for example the salicylates, gentisates, cresotates and β-resorcylates of mono-, di-, or trihydric phenols or of phenolic compounds containing more than one phenolic nucleus. Esters and polyesters formed by the self-condensation of the said phenolic acids may also be used if the said esters contain a hydroxyl group ortho to an ester linkage.

In some cases the aroyl groups in the aromatic esters of aromatic acids may migrate under the influence of the ultra-violet light to give benzophenones. Particular examples of aryl esters of aromatic acids which may be used are p-tertiary-butyl-phenyl salicylate, p-octyl-phenyl salicylate, pyrogallol tri-salicylate, resorcinol mono-gentisate, polyesters of β-resorcylic or gentisic acids, catechol monosalicylate and hydroquinone β-resorcylate.

The final class of compound that may be used as the second component comprises 2-(2'-hydroxy-aryl)-benzotriazole and its substituted derivatives, for instance the 5'-methyl, 5'-tertiary butyl, 5'-amyl, 5'-cyclohexyl, 5'-phenyl, 5'-methoxy, 5'-carbethoxy, 3'5'-dimethyl, 3'5'-dichloro, 4'5'-dichloro, 5'-tertiary butyl-5-chloro, 5'-phenyl-5-chloro, 5'cyclohexyl-5-chloro, 5' - phenyl-5-methyl, 5'-methyl-5-ethyl sulphonyl, 3'5'-dimethyl-5-methyl, 3'5'-dimethyl-5-methoxy, 5'-methyl-5,6-dichloro, and 3'5'- dimethyl-5-ethyl sulphonyl derivatives of 2 - (2'-hydroxy phenyl) benzotriazole, and the esters, e.g. tertiary butyl and hexyl esters, of 2-(2'hydroxy-5'-methyl phenyl) benzotriazole-5-carboxylic acid and 2-(2'hydroxy-4'-5'-dimethyl phenyl) benzotriazole-5-carboxylic acid.

Of these, the 5' alkyl derivatives have been found to be particularly useful. Examples are 2-(2'-hydroxy-5'-methyl)benzotriazole and 2-(2'-hydroxy-5'-t-butyl) - 5-chlorobenzotriazole.

The amount of the two components of the stabiliser system in these compositions may be varied. Thus, compositions useful for a wide variety of applications are effectively stabilised with, for example, 1% or even 0.1% of the second component (based on the weight of polymer); the effect gained by the use of less than 0.1% is in general only slight. It is not usually necessary to add more than 5% by weight of the second component and normally not more than 0.5–1% by weight. In general, we obtain satisfactory results from the use of 0.25 to 1% by weight.

The sulphur compound is used preferably in amounts of from about 0.1% to 5% by weight of the polymer, suitably from 0.25% to 1%. Below 0.1%, the effect is only slight and there is generally insufficient increase in effect to justify the use of more than 5%.

The compositions may be formed by any convenient method in which intimate mixing is effected. For example, the solid polymer may be compounded with the stabilisers or may be dissolved and the stabilisers dispersed or dissolved in the solution; suitable solvents include p-chlorophenol, benzyl alcohol and dimethyl formamide. The polymer may also be melted in vacuo or under an atmosphere of inert gas and the stabilisers thoroughly stirred into the melt.

The compositions of the present invention may also comprise in addition other stabilisers such as phenols, ureas, thioureas, hydrazines, hydrazides, amines, amides, quinones and aromatic nitro compounds and other common additives such as pigments, fillers (e.g. powdered talc, powdered metal or fibrous glass), plasticisers, mould-release agents and lubricants may also be added and our compositions may be moulded, cast into films and sheets or spun into fibres.

Our invention is illustrated by the following examples in which all parts are expressed as parts by weight.

In Examples 1 to 4, each sample was prepared by milling 100 parts of a copolymer containing oxymethylene and a small number of oxyalkylene units with 0.25 part of the sulphur compound and 0.5 part of the second component at 165–170° C. Each composition was pressed at 170° C. into a sheet about 0.005 inch thick.

The stability to light of each sheet was tested by placing a sample a distance of 10 cm. from a Hanovia S. 500 high pressure mercury arc lamp screened by 0.5 mm. borosilicate glass (cutting out light of wavelengths less than 2950 A.) and measuring the development of carbonyl groups by periodical infra-red examination of the samples.

The reported life-times represent times for the development of 0.2% carbonyl oxygen measured by infra-red spectroscopy methods using the absorption band at 5.85 microns.

| Example | Stabiliser system | Light stability (days) |
|---|---|---|
| Test | Nil | <3 |
| 1 | Dilauryl dithiopropionate, p-octyl-phenyl salicylate. | 11 |
| 2 | Dilauryl dithiopropionate, 2-(2'-hydroxy-5'-methyl-phenyl) benzotriazole. | 24 |
| 3 | Dilauryl dithiopropionate, 2-hydroxy-4-n-octyloxy benzophenone. | 14 |
| 4 | Zinc dinoyl dithiophosphate, 2-hydroxy-4-n-octyloxy-benzophenone. | 57 |

In the remaining examples, the samples were prepared in a manner similar to those used in Examples 1 to 4 but the amount of sulphur compound present was raised to 0.5%, based on the weight of polymer. The sheets were again about 0.005 inch thick.

The heat stability of each composition was measured by cutting a 1 inch by 1 inch square from the sheet, placing it in a circulating oven at 140° C. and recording the time at which the sample first became brittle as measured by a manual flex test.

The following examples demonstrate the synergistic effect between a benzophenone and a metal dialkyl dithiophosphate in our stabiliser system.

| Example | Stabiliser system | Light Stability (days) | Heat Stability (days) |
|---|---|---|---|
| Test | Nil | 4 | <0.2 |
| 5 | 2-hydroxy-4-n-octyloxy-benzophenone. | 31–41 | <0.2 |
| 6 | Zinc dinonyl dithiophosphate. | 4½–5 | 3 |
| 7 | Zinc dinonyl dithiophosphate, 2-hydroxy-4-n-octyloxy benzophenone. | 61–65 | 4 |

The next five examples demonstrate the synergistic effect between a benzotriazole and sulphur containing compounds in our stabiliser system.

| Example | Stabiliser system | Light Stability (days) | Heat Stability (days) |
|---|---|---|---|
| Test | Nil | 4 | <0.2 |
| 8 | 2-(2'-hydroxy-5'methyl-phenyl) benzotriazole. | 21–32 | <0.2 |
| 9 | Dilauryl thiodipropionate. | 5–5½ | 2 |
| 10 | Dilauryl thiodipropionate, 2-(2'-hydroxy-5'-methyl-phenyl) benzotriazole. | 32 | 2 |
| 11 | Zinc dinonyl dithiophosphate. | 4½–5 | 3 |
| 12 | Zinc dinonyl dithiophosphate, 2-(2'-hydroxy-5'-methyl phenyl) benzotriazole. | 42 | 13 |

Example 13

Example 10 was repeated using 2-(2'-hydroxy-5'-t-butyl-phenyl)-5-chloro benzotriazole in place of 2-(2'-hydroxy-5'-methyl-phenyl) benzotriazole. The composition showed a light stability of 38 days and a heat stability of 2 days.

By way of comparison a sample containing 2-(2'-hydroxy-5'-methyl phenyl)-5-chloro-benzotriazole alone had a light stability of 24–31 days and a heat stability of less than 0.2 day.

Example 14

Example 12 was repeated using 2-(2'-hydroxy-5'-t-butyl phenyl)-5-chloro-benzotriazole in place of 2-(2'-hydroxy-5'-methyl-phenyl) benzotriazole. The composition showed a light stability of 27–33½ days and a heat stability of 4 days.

By way of comparison a sample containing 2-(2'-hydroxy-5'-methyl-phenyl)-5-chloro-benzotriazole alone had a light stability of 24–31 days and a heat stability of less than 0.2 day.

Example 15

Example 12 was repeated using p-octylphenyl salicylate in place of 2-(2'-hydroxy-5'-methyl-phenyl)-benzotriazole. The composition had a light stability of 22 days and a heat stability of 5 days.

We claim:

1. An oxymethylene polymer composition exhibiting improved stability comprising a high molecular weight oxymethylene polymer and a stabilizing system comprising: (a) zinc dialkyl dithiophosphate and (b) a 2-hydroxy-4-alkoxy benzophenone, each of said dithiophosphate and said benzophenone present in an amount of from 0.1 to 5% by weight, based on the weight of the oxymethylene polymer.

2. An oxymethylene polymer composition according to claim 1 in which the second compound is 2-hydroxy-4-n-octyloxy benzophenone.

3. An oxymethylene polymer composition according to claim 1 in which the oxymethylene polymer contains at least 85 units having the structure —$OCH_2$— for every 100 units in the polymer chain.

4. An oxymethylene polymer composition according to claim 1 in which the first compound is zinc dinonyl dithiophosphate.

5. The oxymethylene polymer composition of claim 4 wherein the second compound is 2-hydroxy-4-n-octyloxy-benzophenone.

References Cited by the Examiner

UNITED STATES PATENTS

| 3,050,500 | 8/1962 | Sherwood | 260—45.95 |

FOREIGN PATENTS

| 599,409 | 7/1961 | Belgium. |
| 971,262 | 9/1964 | Great Britain. |
| 991,641 | 5/1965 | Great Britain. |
| 992,312 | 5/1965 | Great Britain. |
| 1,329,114 | 4/1963 | France. |

LEON J. BERCOVITZ, *Primary Examiner.*

G. W. RAUCHFUSS, JR., *Assistant Examiner.*